United States Patent [19]

Loup

[11] Patent Number: 4,690,366

[45] Date of Patent: Sep. 1, 1987

[54] SYSTEM FOR HOLDING AN ELECTRIC MOTOR IN A HOUSING

[75] Inventor: Didier Loup, Maurepas, France

[73] Assignee: Valeo, Paris, France

[21] Appl. No.: 807,607

[22] Filed: Dec. 11, 1985

[30] Foreign Application Priority Data

Dec. 20, 1984 [FR] France ................. 84 19578

[51] Int. Cl.$^4$ ............................................. F16M 1/00
[52] U.S. Cl. ..................................... 248/676; 310/89
[58] Field of Search ................. 248/674, 671; 310/89, 310/91, 62, 63

[56] References Cited

U.S. PATENT DOCUMENTS 3,622,822  11/1971  Lofstrand ............................. 310/89
4,005,320  1/1977  Mabuchi et al. ................... 310/89 X Primary Examiner—Ramon S. Britts
Assistant Examiner—Blair M. Johnson
Attorney, Agent, or Firm—Dennison, Meserole, Pollack & Scheiner

[57] ABSTRACT

A system for retaining an electric motor (10) in a housing (24) having a wall which includes an orifice (40) through which a connector (42) passes to connect the motor to a source of electricity. The connector (42) has a projecting lug (56) which is received in a notch (58) in the cage (12) of the motor and which constitutes a retaining member for preventing the motor from being withdrawn from the housing (24). The invention is particularly applicable to electric motors used to drive fans in installations for heating and ventilating or for air conditioning motor vehicles.

11 Claims, 4 Drawing Figures

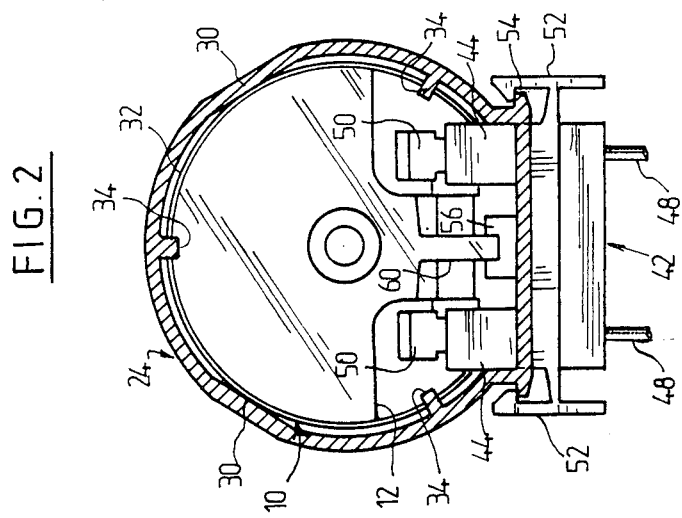

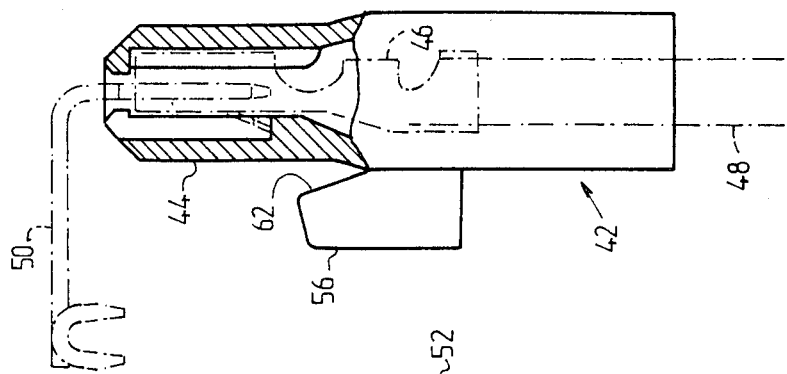
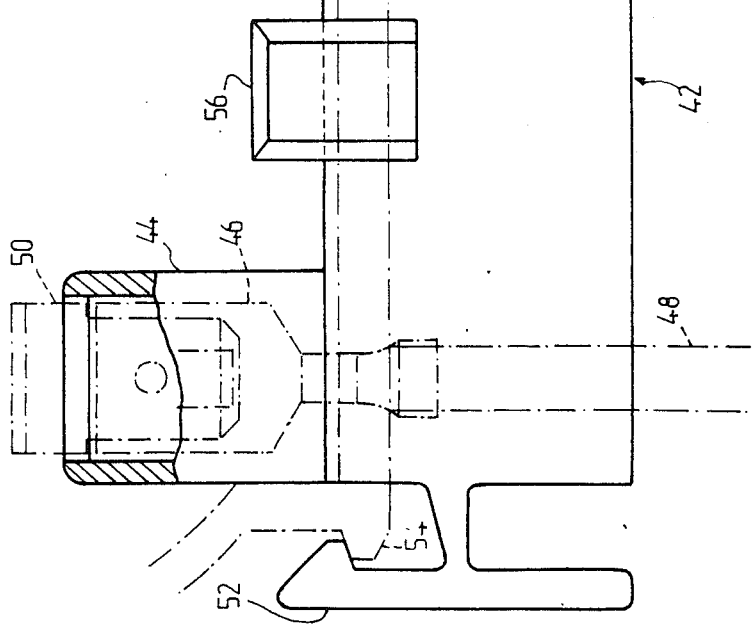

SYSTEM FOR HOLDING AN ELECTRIC MOTOR IN A HOUSING

The invention relates to a system for holding an electric motor in a housing, and is applicable in particular in the automobile industry.

BACKGROUND OF THE INVENTION

The fans used in installations for heating and ventilating or for air conditioning motor vehicles comprise a bladed wheel fixed on the shaft of an electric motor and housed in a volute (i.e. an air flow casing) of a housing which also houses and supports the electric motor. The portion of the housing which receives the electric motor includes means for positioning and centering the motor, which means cooperate with the motor cage or frame. The motor is fixed or retained in the housing by screws engaged in holes through a bottom wall of the housing, with the screws being screwed into captive nuts held by the motor cage or frame.

Such motor fixing means suffer from several drawbacks: firstly they require specific action to be taken when the motor is mounted in the housing, secondly the fixing screws transmit noise to the outside of the housing, and thirdly the fixing screws apply forces to the motor cage. Since the motor cage is generally made of plastic, it is deformed in the long run, to a greater or lesser extent, thereby interfering with correct operation of the motor.

Preferred implementations of the invention avoid these prior art drawbacks and simplify the operations of mounting and fixing an electric motor in a housing.

SUMMARY OF THE INVENTION

The present invention provides a system for retaining an electric motor in a housing, said motor including a cage or frame for supporting the stator and for guiding the motor shaft, the housing including centering and abutment means co-operating with said cage for positioning the motor relative to the housing, a wall of said housing including an orifice for passing a connector suitable for being engaged on two tabs for feeding electricity to the motor, which tabs are fixed on said cage, the device including the improvement whereby said connector includes a lug suitable for being received in a notch in a portion of the motor cage, said lug constituting, when said connector is mounted on said tabs through said orifice, a member for retaining the motor in the housing.

Thus, in accordance with the invention, the connector which is used to feed the motor with electricity is also used as the means for retaining or fixing the motor in the housing. The screws used in the prior art are omitted and all the drawbacks associated with the use of screws are thus avoided.

The connector preferably also includes two side arms having hooks which snap fit over a rim formed on said wall of the housing around the orifice through which the connector passes, thereby fixing the connector to the housing.

This prevents the connector from being accidentally removed without complicating the operations of assembling or fixing a motor in the housing.

The above-mentioned notch may advantageously be formed in a rib on the motor cage, said rib extending in a plane which includes the axis of rotation of the motor, with the connector-passing orifice being oriented radially relative to the axis of rotation of the motor and with the above-mentioned lug on the connector including an oblique side face which is parallel to an oblique edge of said notch.

It is thus possible in a simple and effective way to ensure that the connector is properly mounted on the housing and to ensure that the motor is properly held in the housing in spite of the manufacturing tolerances inherent to the motor cage, the connector and the housing being mass-produced.

Furthermore, the connector lug is advantageously formed so that it projects from a side face of the connector with the connector-passing orifice having an edge which includes a cutout of corresponding shape to receive said projecting lug, thereby providing keying means to ensure that the connector can be passed through said orifice in one way only.

Thus, when the electric motor is a DC motor there is no danger of it being reverse-connected to a source of DC.

BRIEF DESCRIPTION OF THE DRAWINGS

An embodiment of the invention is described by way of example with reference to the accompanying drawings, in which:

FIG. 1 is a diagrammatic axial section through an electric motor received in a housing;

FIG. 2 is a diagrammatic cross-section on line II—II of FIG. 1;

FIG. 3 is a plan view on a larger scale showing a connector in accordance with the invention; and FIG. 4 is a side view of said connector.

MORE DETAILED DESCRIPTION

The electric motor 10 shown in FIGS. 1 and 2 comprises, in conventional manner, a cage or frame 12 made of plastic material which supports the stator of the motor 10 and whose ends provide support and guidance by means of bearings (not shown) for the shaft 14 of the motor 10, which shaft has the rotor of the motor fixed thereon.

In the example shown, a wheel 16 having blades or fins 18 is mounted on one end of the shaft 14, e.g. by a forcefit, in order to be driven in rotation about the axis 20 of the shaft 14 when the motor is fed with electricity.

The bladed wheel 16 rotates in a volute or air circulation casing 22, with only a part thereof being shown in FIG. 1. The volute 22 may have a housing 24 fixed thereon or it may be integral with such a housing 24.

The housing 24 has a substantially cylindrical recess 26 which is closed at one end by a bottom wall 28 and whose other end is open so that the motor 10 can be inserted into the recess 26.

The cylindrical inside surface of the recess includes flats 30, e.g. three flats at 120° intervals, which cooperate with the outside surface of a cylindrical ring 32 on the motor cage or frame 12. The recess also includes longitudinal ribs 34, e.g. three ribs at 120° intervals from one another, which extend from the bottom wall 28 for such a distance that their ends 36 away from the bottom wall 28 constitute stops against which the end 38 of the ring 32 comes into abutment.

When the motor 10 is inserted into the recess 26 in the housing 24, it is centered between the flats 30 and it is pushed until it comes into abutment against the ends 36 of the ribs 34.

The cylindrical wall of the recess 26 also includes an opening 40 which is radially disposed relative to the axis of rotation 20 of the motor, and which constitutes a passage through which a connector 42 may pass. The connector 42 has two parallel tubular arms 44 which fixedly retain female connectors 46 (shown in dot dashed lines in FIGS. 3 and 4) connected to respective conductors 48 and suitable for receiving respective male connector tabs 50 which are fixed to the cage 12 of the motor 10. The figures show conventional "spade" connector tabs and corresponding female connectors. Electrical connection is established by inserting the connector 42 through the orifice 40 in the cylindrical wall of the recess 26.

The connector 42 also includes side arms 52 having hooks which snap-fit resiliently over a rim 54 formed on the outside face of the cylindrical wall of the housing, said rim being disposed around the orifice 40 through which the connector 42 is inserted. The hook arms 52 serve to removably fix the connector on the housing 42 by resiliently snapping over the rim 54 when the connector 42 is pushed home through the orifice 40.

The connector 42 further includes a lug 56 which projects from one of its side faces and which extends in the same direction as the connector arms 44 so as to be received in a notch 58 formed in a longitudinal rib 60 on the motor cage 12. The rib 60 lies in a plane which includes the axis of rotation 20 of the motor and the general orientation of the connector lug 56 is substantially radial, when the connector is in place in the housing 24. One of the front or rear faces of the lug 56, e.g. the rear face 62 relative to the wheel 16, is oblique and the corresponding edge 64 of the notch 58 is parallel to said oblique face, thereby facilitating insertion of the lug 56 into the notch 58 in spite of the dimensional dispersion to be expected from said items being mass produced.

As can be seen in FIGS. 3 and 4, the lug 56 projects from one of the faces of the connector 42 and the connector-passing orifice 40 through the cylindrical wall of the motor-receiving recess 26 in the housing 24 includes a cutout which is complementary in shape to the lug 56 and which receives the lug when the connector is inserted through the orifice for connection to the motor. Thus, if the motor is a DC motor, it is possible to ensure that the motor connection tabs 50 are properly connected to the positive and negative terminals of a source of DC by means of the connector and there is no danger of the motor being reverse connected.

The connector 42 preferably closes the orifice 40 in a substantially sealed manner when connected to the motor.

When the motor 10 is pushed into the recess 26 of the housing 24, so as to bring its ring 32 into abutment against the ends 36 of the ribs 34, insertion of the connector 42 into the connector-passing orifice 40 serves firstly to connect the motor to its source of electricity, and secondly to ensure that the motor is retained in the housing 24 by virtue of the lug 56 being received in the notch 58. The motor is thus locked in the housing 24 without a deforming stress being applied to the motor cage 12. Furthermore, retaining the motor in the housing 24 by means of the connector 42 avoids transmitting noise outside the housing as happens when screws are used in the prior art method. Generally speaking, the lug 56 serves solely as a safety device for preventing the motor from leaving its recess in the housing, and there is no need for the end of the lug to be in close contact with the sides of the notch. It is only necessary for the lug 56 to be engaged far enough into the notch 58 to prevent the motor from being withdrawn from the housing.

I claim:

1. A system for retaining an electric motor in a housing against withdrawal therefrom, said system comprising said motor including a cage supporting the stator and guiding the motor shaft, said motor further including two tabs, the housing including a motor-receiving open end and centering and abutment means cooperating with said cage and slidably receiving and positioning the motor within the housing through said open end, said housing having a wall including an orifice defined therethrough, a connector passing through said orifice and being engaged on said two tabs for feeding electricity to the motor, which tabs are fixed on said cage within said housing; a notch defined in said cage aligned with said housing orifice, said connector including a lug received through said orifice and into said notch when said connector is passed through said orifice and engaged with said tabs, said lug comprising a member independently of said tabs retaining the motor within the housing when said connector is engaged.

2. A system according to claim 1, including a rim formed on said housing wall around said connector-passing orifice, the connector also including two side arms having hooks for cooperating by resilient snap-fastening with said rim, thereby fixing the connector to the housing.

3. A system according to claim 1, wherein said notch is formed in a rib on the motor cage.

4. A system according to claim 3, wherein said rib extends in a plane which includes the axis of rotation of the motor.

5. A system according to claim 1, wherein the connector-passing orifice is radially oriented relative to the axis of rotation of the motor.

6. A system according to claim 1, wherein the connector lug includes an oblique face which is parallel to an oblique edge of said notch.

7. A system according to claim 1, wherein said connector closes said orifice through the housing wall in a substantially sealed manner when inserted therein.

8. A system according to claim 1, wherein said lug projects from a face of the connector and wherein a side of the connector-passing orifice includes a correspondingly shaped cutout for receiving said projecting lug.

9. A system according to claim 5 wherein said housing further includes an inner closed end, said housing wall extending between said open and closed ends, said connector-passing orifice being in inwardly spaced relation to the open end of said housing whereby engagement of said lug through said orifice and into said notch precludes withdrawal of said motor through said housing open end.

10. A system according to claim 9 wherein said connector lug, when engaged through said orifice, includes an oblique face directed toward the inner closed end of said housing, said notch including a complementary oblique face engaged by the oblique lug face whereby positive motor-retaining engagement of the lug within the notch is ensured.

11. A system according to claim 1 wherein said connector includes a pair of spaced projecting electrical connecting members engageable with said two tabs, said lug projecting independently of and in spaced relation to the tab-engaging connecting members.

* * * * *